2,901,353

PROCESS FOR DEBITTERING SOYBEANS

Katsusaburo Hirose, Tsurumiku, Yokohama City, Kanagawa Prefecture, Japan

No Drawing. Application July 1, 1957
Serial No. 668,927

3 Claims. (Cl. 99—98)

The soybean is an oleaginous seed of high nutritional value consisting principally of lipides, proteins, carbohydrates and mineral constituents. However, since it has disagreeable odors and flavors, it is not much welcomed as a foodstuff.

Heretofore, many attempts have been made to remove said "beany" odors and flavors. Most of them treat ground soybeans and the processing costs are rather high in comparison with cheap soybeans.

The present invention relates to a process for debittering unground whole soybeans and has for its object to drive off completely the "beany" odors and flavors from soybeans in a very simple and economical manner.

According to this invention, after soybeans are soaked in water for a short period of time, they are placed in an inclined drum and subjected to indirect heating at low temperature while rotating said drum.

When the soybeans are soaked in water for 10 minutes, the seed covers swell and begin to wrinkle. The water content at this stage is about 1 or 2% relative to the weight of the soybeans treated.

I have found that if said small amount of water be vaporized off from the soybeans by gentle heating, the complete debittering effect may be obtained. More than 1 or 2% of water content is not necessary to debitter soybeans and is considered to be wasteful because it would necessitate a drying operation.

Further according to this invention, the temperature at which the heating operation is effected is as low as 80° or 90° C. At such a low temperature, there is no danger of scorching the material.

In carrying out the present invention, first, soybeans are soaked in water for about 10 minutes, then taken out of water when the seed covers swell and begin to wrinkle, and put into an inclined drum and subjected to indirect heating for about 30 minutes while rotating said drum, the temperature within said drum being kept at about 80° C.

If soybeans are soaked in water for a sufficiently long time, the primary root of the young seedling will emerge from a minute opening in the seed coat. The water at this stage contains many enzymes which have been found to be very active to debitter soybeans.

In a modification of the present invention, soybeans are soaked in the above mentioned enzyme-rich water for about 10 minutes until the seed covers swell and begin to wrinkle. The soybeans are then taken from said water and without subjecting them to special heating, are spread on a mat and let dry naturally by sun heat. In this manner, complete debittering results can be obtained most economically.

I claim:

1. Process for debittering soybeans, which comprises treating soybeans with enzyme enriched water to bring about absorption of a small amount of water in said soybeans, said enzyme enriched water being prepared by soaking soybeans in water for a time sufficient to permit the primary root of the young seedlings to emerge from the seed coat, and then subjecting said treated soybeans to drying at a relatively low temperature.

2. Process for debittering soybeans according to claim 1, wherein said drying is effected at a temperature up to 80° C.

3. Process for debittering soybeans according to claim 1 wherein said drying is effected at approximately atmospheric temperature.

References Cited in the file of this patent

UNITED STATES PATENTS

| | | |
|---|---|---|
| 1,556,865 | Muller | Oct. 13, 1925 |
| 1,912,895 | Gossel | June 6, 1933 |
| 2,026,676 | Gill | Jan. 7, 1936 |